United States Patent Office 2,793,084
Patented May 21, 1957

2,793,084

APPARATUS FOR STORING AND TRANSPORTING POWDERED MATERIAL

Sydney Wilson and James Ernest Conacher, London, England, assignors to Blaw Knox Limited, London, England, a British company Application March 9, 1954, Serial No. 415,080

12 Claims. (Cl. 302—55)

This invention relates to apparatus for use in storing and transporting powdered material, for example, cement.

According to the present invention there is provided apparatus for storing and transporting powdered material, wherein a storage hopper is arranged for filling powdered material into an activator, the activator being arranged periodically to blow powdered material contained therein, along a delivery pipe, there being a first valve for controlling the filling of the activator and a second valve for controlling the blowing of the activator, the valves being interconnected so that blowing and filling take place alternately, and there being delay means provided for controlling the operation of the valves so that the apparatus automatically changes from filling to blowing after a predetermined delay period.

Figure 1:
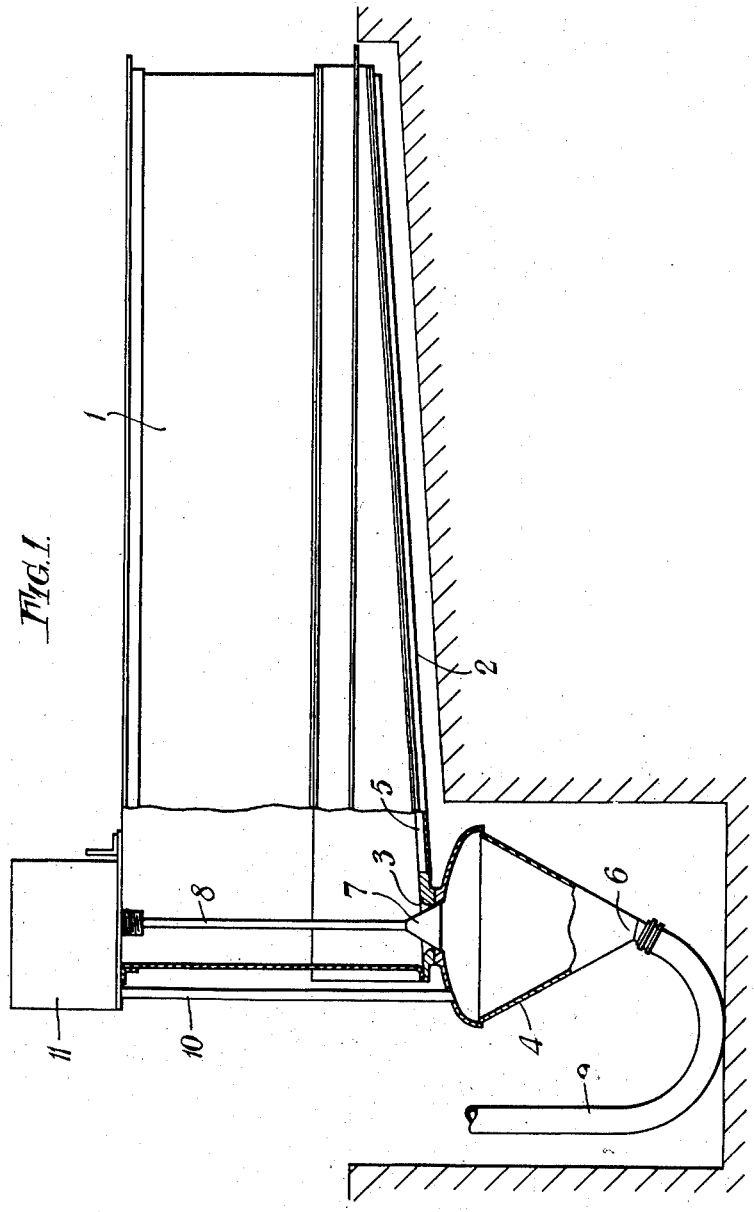
Figure 2:
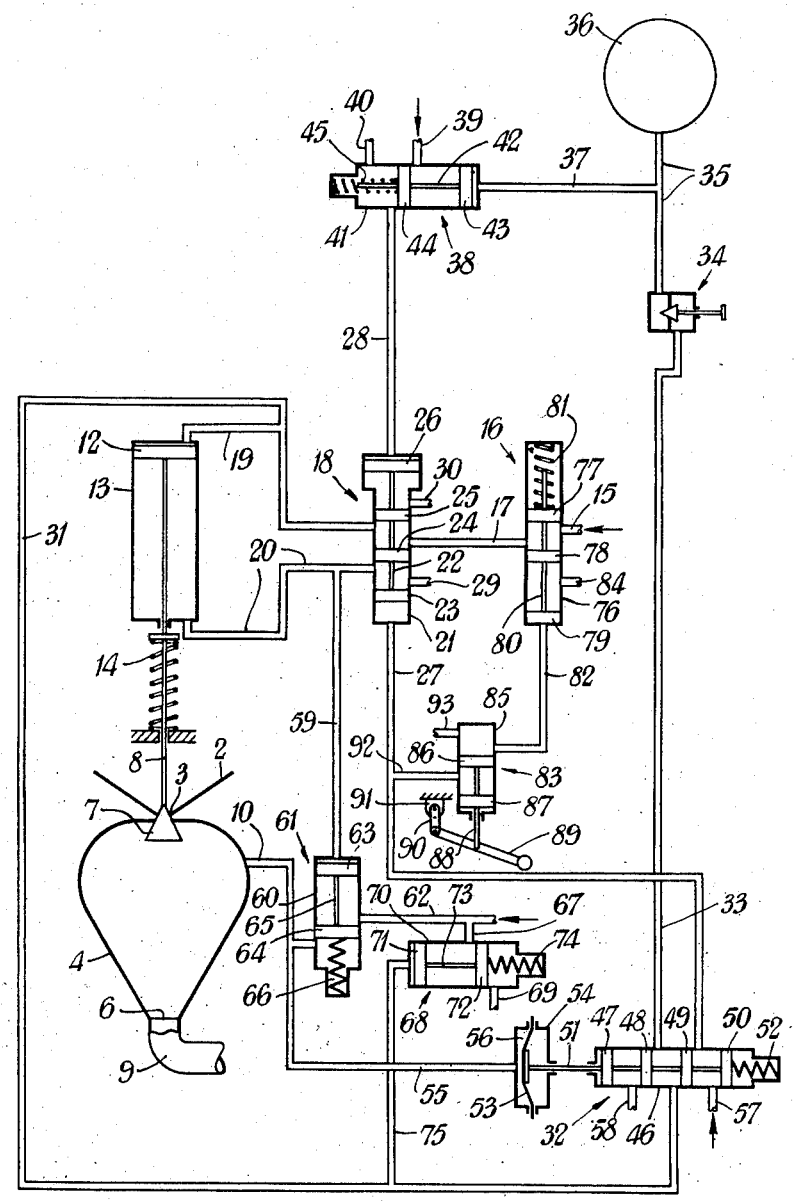

For a better understanding of the invention, and the method of carrying the same into effect, reference will now be made to the accompanying drawings in which:

Figure 1 is a diagrammatic part-sectional elevation of apparatus for storing and transporting powdered material, and Figure 2 is a diagram of the pneumatic valve system for controlling the apparatus of Figure 1.

Referring to Figure 1, the storing and transporting apparatus has a large rectangular shaped receiving hopper 1 for storing cement. The hopper 1 is filled by discharging powdered cement into the top of the hopper from, for example, a tipper truck. A canvas cover may be provided for closing the top of the hopper 1 when the latter is not in the process of being filled. The bottom of the hopper 1 has a sloping floor 2 forming a chute for directing the contents of the hopper to the inlet 3 of a small cement activator 4. The sloping floor 2 of the hopper is provided with a Fuller Co. "air slide" having a porous plate 5 connected to have low pressure air blown therethrough to assist the movement of powdered cement towards the activator inlet 3.

The activator 4 essentially consists of a hollow conical shaped container disposed vertex downwards. An outlet 6 is located at the vertex. The inlet 3 is located at the top of the container immediately above the outlet 6. A valve head 7 on a vertically disposed valve stem 8 is provided for opening and closing the activator inlet 3. The valve head 7 is mounted on the stem 8 so that in the lower position of the latter the inlet 3 is open, and in the upper position of the stem 8, the inlet 3 is closed. A delivery pipe 9 leads from the outlet 6 for conveying powdered cement to the desired location.

A pipe 10 for delivering compressed air under pressure to the activator 4 communicates with the top portion of the latter. The stem 8 and the pipe 10 lead from the activator 4 into a control unit 11 carried on the hopper 1. A piston 12 secured on the upper end of the stem 8 is located in a vertical ram cylinder 13. The stem 8 and piston 12 are urged upwardly by a spring 14.

High pressure air from a source not shown is conveyed by a conduit 15 through a shut-off valve 16 (normally open) to a conduit 17 which leads to a change-over valve 18. The change-over valve 18 directs the high pressure air either to a conduit 19 leading to the upper end of the ram cylinder 13 or to a conduit 20 leading to the lower end of the ram cylinder 13. The change-over valve 18 consists of a cylinder 21 containing a piston rod 22 having four pistons 23, 24, 25 and 26 thereon. The piston 26 is of a diameter larger than that of the other three pistons and operates in a portion of the cylinder which is of enlarged diameter. The change-over valve 18 is operated (in a manner described in greater detail hereinafter), by high pressure air delivered to the lower end of the cylinder 21 by way of conduit 27 and to the upper end of the cylinder 21 by way of conduit 28. In the position shown in Figure 2 the conduit 17 communicates with the conduit 19 and the conduit 20 communicates with an exhaust pipe 29. When the pistons are moved to their lower positions, the conduit 17 communicates with the conduit 20 and the conduit 19 communicates with an exhaust pipe 30.

The conduit 19 communicates by way of a conduit 31, a pressure-sensitive valve 32, a conduit 33, a needle valve 34 which restricts the air flow therethrough and a conduit 35, with a reservoir 36. A conduit 37 connected to the conduit 35 leads to a pressure-sensitive valve 38. The valve 38 serves for connecting the conduit 28 either with a high pressure air supply pipe 39 or with an exhaust pipe 40. The valve 38 consists of a cylinder 41 having therein a piston rod 42 upon which are mounted pistons 43 and 44. A spring 45 is located between the left-hand end (Figure 2) of the cylinder 41 and the piston 44 for urging the piston assembly towards the right. The conduit 37 communicates with the right-hand end of the cylinder 41. In the position shown in Figure 2 the conduit 28 communicates with the exhaust pipe 40. When the pressure in the conduit 37 rises to a sufficiently high value, the piston assembly is moved to the left to prevent communication between the conduit 28 and pipe 40 and to cause communication between the conduit 28 and the pipe 39.

The pressure-sensitive valve 32 consists of a cylinder 46 having four pistons 47, 48, 49 and 50 thereon. The pistons are mounted on a rod 51 and a spring 52 is located between the piston 50 and the right-hand end (Figure 2) of the cylinder 46 for urging the piston assembly to the left to the position shown in Figure 2. The left-hand end of the rod 51 is secured to a diaphragm 53 located in a container 54. A conduit 55 leads from the pipe 10 to a chamber 56 formed by the diaphragm 53 and the container 54. When the valve 32 is in the position shown in Figure 2, the conduit 31 communicates with the conduit 33 and the conduit 27 (which is connected to the valve 32) communicates with a high pressure air supply pipe 57. When air under pressure is delivered to the chamber 56 by the conduit 55, the piston assembly in the cylinder 46 is deflected to the right against the action of the spring 52 until the conduit 27 communicates with the conduit 31 and the conduit 33 communicates with an exhaust pipe 58.

A conduit 59 leads from the conduit 20 to the upper end of the cylinder 60 of a pressure-sensitive valve 61 which controls the supply of air to the pipe 10 from a low pressure air supply pipe 62. By "low pressure air" is meant air under a pressure above atmospheric but below that of the high pressure air referred to above. The valve 61 has, within its cylinder 60, two pistons 63 and 64 mounted on a piston rod 65. A spring 66 is located between the bottom of the cylinder and the piston 64 for urging the piston assembly upwards. In the position shown in Figure 2 the valve 61 prevents the supply of low pressure air to the pipe 10. When, however, high pressure air is delivered to the conduit 59, the piston assembly is moved downwardly against the opposition of the spring 66 until the conduit 62 communicates with the pipe 10.

A branch pipe 67 leads from the pipe 62 through a pressure-sensitive valve 68 to a pipe 69 which is connected to deliver air to the porous plate 5. The valve 68 consists of a cylinder 70 containing pistons 71 and 72 connected together by a rod 73. A spring 74 is located between the piston 72 and the right-hand end of the cylinder 70 for urging the piston assembly to the left. A conduit 75 connects the left-hand end of the cylinder 70 with the conduit 31. In the position shown in Figure 2 communication between the pipes 67 and 69 is prevented. When, however, high pressure air is delivered to the left-hand end of the cylinder 70 by the conduit 75, the pistons 71, 72 are urged to the right against opposition of the spring 74 until the pipe 67 communicates with the pipe 69.

The shut-off valve 16 consists of a cylinder 76 having therein pistons 77, 78 and 79 mounted on a rod 80. A spring 81 is located between the piston 77 and the upper end of the cylinder 76. A conduit 82 communicates with the lower end of the cylinder 76, the conduit 82 leading from a valve 83. In the position of the valve 16 as shown in Figure 2, the pipe 15 communicates with the conduit 17. When, however, high pressure air is delivered to the valve 16 through the conduit 82, the pistons are urged upwardly against the opposition of the spring 81 until communication between the conduit 17 and the conduit 15 is prevented, the conduit 17 then communicating with an exhaust pipe 84. The valve 83 consists of a cylinder 85 having therein pistons 86 and 87 mounted on a rod 88 the lower end of which is pivoted to the central part of a manually operable control lever 89, one end of which is pivotally connected by a link 90 to a fixture 91. A conduit 92 leads from the conduit 27 to the valve 83. An exhaust pipe 93 communicates with the upper part of the cylinder 85. With the parts in the position shown in Figure 2, the valve 83 prevents communication between the conduit 92 and the conduit 82, the latter communicating with the exhaust pipe 93. When, however, the right-hand end of the lever 89 is lifted, communication between the conduit 82 and the exhaust pipe 93 is cut off and the conduit 82 then communicates with the conduit 92.

The apparatus described above operates as follows. With the parts in the position shown in Figure 2, high pressure air from the conduit 15 passes through the shut-off valve 16, the conduit 17, the valve 18, and the conduit 19 to the upper end of the ram cylinder 13. The lower end of the ram cylinder communicates via the conduit 20 and the change-over valve 18 with the exhaust pipe 29. The valve 61 is shut so that no low pressure air is being supplied to the activator 4. The piston 12 is moved to the bottom of the cylinder 13 by the high pressure air being delivered to the top of the ram cylinder and the valve 7 opens the inlet 3 so that powdered cement flows from the hopper 1 into the activator 4. High pressure air from the conduit 19 is delivered by the conduit 31 and the conduit 75, to the valve 68 whereby the latter is opened to connect the porous plate 5 with the low pressure air supply pipe 62 via the pipe 69. High pressure air also passes from the conduit 31 through the valve 32, the conduit 33 and the restriction formed by the valve 34 to the conduit 35 and thence to the reservoir 36. Whilst the activator is filling with cement powder, the pressure in the reservoir 36 is rising, the rate at which the pressure rises being controlled by the needle valve 34. When the pressure in the reservoir 36 has risen to a sufficiently high value, the valve 38 is operated to connect the conduit 28 with the high pressure air supply pipe 39. When this occurs the pistons 23—26 are moved downwardly in the change-over valve 18. This occurs in spite of the fact that the lower end of the cylinder 21 is connected to the high pressure supply pipe 57 through the valve 32, because the piston 26 is of larger area than the piston 23. Movement of these four pistons downwardly causes the conduit 19 to be connected to the exhaust pipe 30 and the conduit 20 to be connected with the supply of high pressure air and hence the piston 12 is moved to the upper end of the ram cylinder 13 and the valve head 7 closes the inlet 3 of the activator 4. When the piston 12 has reached the top of the cylinder 13, cessation of movement of the piston 12 allows a build-up of pressure in the conduit 20 and this pressure build-up is sufficient to cause operation of the valve 61 that is connected to the conduit 20 and conduit 59. When the valve 61 is opened, low pressure air is supplied to the activator 4 by way of the pipe 10. Cement powder in the activator 4 is then blown through the pipe 9 to the desired location. The increase in pressure in the pipe 10 is communicated to the chamber 56 by the conduit 55, whereupon the valve 32 is operated to connect the conduit 27 with the conduit 31 and thereby with the exhaust pipe 30, and also to connect the conduit 33 with the exhaust pipe 58. The high pressure air in the reservoir 36 therefore leaks away to exhaust through the valve 34 and conduit 33. The spring 45 in the valve 38 thereupon reasserts itself and returns the valve 38 to the position shown in Figure 2 whereby the conduit 28 communicates with the exhaust pipe 40. The valve 18, however, does not change over at this juncture since the conduit 27 also communicates with exhaust by way of the conduit 31, conduit 19 and the exhaust pipe 30.

When the cement powder has been blown from the activator 4, the pressure in the activator drops whereby the pressure in the chamber 56 also drops. This drop in pressure in the chamber 56 is sufficient to allow the spring 52 to re-assert itself and to cause the valve 32 to resume the position shown in Figure 2. High pressure air is then delivered to the conduit 27 and the change-over valve 18 is caused to resume the position shown in Figure 2 and the cycle of events is repeated.

It will be noted that the adjustment of the needle valve 34 controls the rate of build-up of pressure in the reservoir 36 and determines the period during which the inlet 3 remains open to permit filling of the activator 4. It should also be noted that blowing of the activator 4 does not commence until the inlet 3 has been closed.

When it is desired to stop the apparatus from operating, the lever 89 is raised whilst the activator 4 is blowing. When this lever 49 is raised the valve 83 is opened and the conduit 82 is put in communication with the conduit 27 by way of the conduit 92 and the open valve 83. At the end of the blowing period, the valve 32 is opened to connect the conduit 27 with the high pressure air pipe 57 and hence the lower end of the cylinder 76 has high pressure air delivered thereto and the pistons 77, 78 and 79 are caused to move upwardly to prevent communication between the conduit 15 and the conduit 17 which latter is put into communication with the exhaust pipe 84. When this occurs, both sides of the ram cylinder 12 communicate with exhaust, the spring 14 retains the head 7 in the closed position and the valve 61 shuts off the supply of low pressure air to the activator 4.

We claim:

1. Apparatus for handling powdered material comprising an activator having an inlet and a discharge outlet, a first valve controlling the flow of material to said activator so that filling of the latter will take place on opening of said valve, a pneumatic ram operatively connected to said valve to actuate the same, a changeover valve for delivering air under pressure to one side or the other of said ram, an air reservoir to which air is supplied simultaneously with air for moving the ram to effect opening of said first valve, a pressure sensitive device communicating with said reservoir and operable when the pressure in the latter reaches a predetermined value to effect operation of said changeover valve thereby to cause said ram to close said first valve and a further valve adapted on being moved into an open position to allow air to be admitted to said activator thereby to blow the material present therein through said discharge outlet, said further valve being opened only when the pressure of air delivered to the ram to effect closure of said first valve reaches a predetermined value.

2. Apparatus for storing and transporting powdered material as claimed in claim 1 and further comprising means whereby the admission of air to said reservoir may be controlled.

3. Apparatus for storing and transporting powdered material comprising an activator having an inlet and a discharge outlet, a storage hopper communicating with said activator inlet, a first valve controlling the flow of material from said hopper to said activator so that filling of the latter will take place on opening of said valve, a pneumatic ram for actuating said valve, a changeover valve for delivering air under pressure to one or other side of said ram, an air reservoir to which air is supplied simultaneously with air for moving the ram to effect opening of said first valve, a pressure sensitive device communicating with said reservoir and operable when the pressure in the latter reaches a predetermined value to actuate said changeover valve thereby to cause said ram to close said first valve, a further valve operable, when the pressure of air delivered to the ram to close said first valve reaches a predetermined value, to allow admission of air to said activator thereby to blow material present therein through said discharge outlet and a pressure sensitive element communicating with the interior of said activator and connected to cause further operation of said changeover valve with consequent opening of said first valve when the pressure in said activator drops below a predetermined value.

4. Apparatus for storing and transporting powdered material as claimed in claim 3 and further comprising means whereby the admission of air to said air reservoir may be controlled.

5. Apparatus for storing and transporting powdered material comprising an activator having air inlet and a discharge outlet, a storage hopper communicating with said activator inlet, a first valve controlling the flow of material from said hopper to said activator so that filling of the latter will take place on opening of said valve, a pneumtaic ram for actuating said valve, a changeover valve for delivering air under pressure to one or other side of said ram, an air reservoir to which air is supplied simultaneously with air for moving the ram to effect opening of said first valve, a pressure sensitive device communicating with said reservoir, a third valve operable under the influence of said pressure sensitive device when the pressure in said reservoir reaches a predetermined value, to actuate said changeover valve thereby to cause said ram to close said first valve, a fourth valve operable when the pressure of air delivered to the ram to close said first valve reaches a predetermined value, to allow admission of air to said activator thereby to blow material present therein through said discharge outlet, a pressure sensitive element communicating with the interior of said activator and a fifth valve controlled by said pressure sensitive element said fifth valve being adapted to control the admission and exhaustion of air to and from the air reservoir and in conjunction with said third valve to control the supply of air to said changeover valve the arrangement being such that when the pressure in said activator drops below a predetermined value said fifth valve will be operated to allow air to be supplied to the changeover valve thereby to effect opening of said first valve.

6. Apparatus for storing and transporting powdered material as claimed in claim 5 and further comprising manually adjustable means whereby the admission of air to said air reservoir may be controlled.

7. Apparatus for storing and transporting powdered material comprising an activator having an inlet and a discharge outlet, a storage hopper communicating with said activator inlet, means whereby material within said hopper may be aerated to facilitate its passage to said activator, a first valve controlling the flow of material from said hopper to said activator so that filling of the latter will take place on opening of said valve, a pneumatic ram for actuating said valve, a changeover valve for delivering air under pressure to one or other side of said ram, an air reservoir to which air is supplied simultaneously with air for moving the ram to effect opening of said first valve, a pressure sensitive device communicating with said reservoir and operable when the pressure in the latter reaches a predetermined value to actuate said changeover valve thereby to cause said ram to close said first valve, a further valve operable, when the pressure of air delivered to the ram to close said first valve reaches a predetermined value, to allow admission of air to said activator thereby to blow material present therein through said discharge outlet and a pressure sensitive element communicating with the interior of said activator and connected to cause further operation of said changeover valve with consequent opening of said first valve when the pressure in the activator drops below a predetermined value and a master shut-off valve for cutting off the supply of air through the changeover valve to the ram.

8. Apparatus for storing and transporting powdered material comprising an activator having an inlet and a discharge outlet, a storage hopper communicating with said activator inlet, an "air slide" within said hopper, a first valve controlling the flow of material from said hopper to said activator so that filling of the latter will take place in opening of said valve, a pneumatic ram operatively connected to said valve to actuate the same, a changeover valve for delivering air under pressure to one or other side of said ram, an air reservoir to which air is supplied simultaneously with air for moving the ram to effect opening of said first valve, a pressure sensitive device communicating with said reservoir and operable when the pressure in the latter reaches a predetermined value to actuate said changeover valve thereby to cause said ram to close said first valve, a third valve operable when the pressure of air delivered to the ram to close the first valves reaches a predetermined value, to allow admission of air to said activator thereby to blow material present therein through said discharge outlet, a pressure sensitive element communicating with the interior of said activator and connected to cause further operation of said changeover valve and consequent opening of said first valve when the pressure in said activator drops below a predetermined value, and a further valve operable as a result of operation of the changeover valve to effect opening of said first valve, to supply air to the air slide thereby to aerate the material in the hopper and to facilitate its passage to the activator.

9. Apparatus for storing and transporting powdered material as claimed in claim 8 and further comprising a master shut-off valve for cutting off the supply of air through the changeover valve to the ram.

10. Apparatus for storing and transporting powdered material comprising an activator having an inlet and a discharge outlet, a first valve controlling said inlet and hence the admission of material to said activator, a double acting ram operatively connected to said valve to actuate the same, a changeover valve whereby air under pressure may be selectively directed to a side of said ram thereby to effect opening and closing of said valve, pneumatically operated means for effecting periodic operation of the changeover valve, a second valve adapted normally to assume a closed position but on opening to allow air to be admitted to said activator thereby to blow material present therein through said discharge outlet and pressure responsive means controlling said second valve, such means being operative to effect opening of said second valve as a result of a build up in pressure behind the ram at the conclusion of that operative stroke thereof which results in closure of said first valve.

11. Apparatus for storing and transporting powdered material comprising an activator having an inlet and a discharge outlet, a first valve controlling said inlet and hence the admission of material of said activator, a double acting ram operatively connected to said valve to control the same, a changeover valve whereby air under pressure may be selectively directed to a side of said ram thereby to effect opening and closing of said valve, means operative, as a result of a build up in pressure during movement of the ram to open the first valve, to effect operation of said changeover valve with subsequent reversal of the ram and closure of said first valve, a second valve adapted normally to assume a closed position but on opening to allow air to be admitted to said activator thereby to blow material present therein through said discharge opening and pressure responsive means controlling said second valve such means being operative to effect opening of said second valve as a result of a build up in pressure behind the ram at the conclusion of that operative stroke thereof which results in closure of said first valve.

12. Apparatus for storing and transporting powdered material comprising an activator having an inlet and a discharge outlet, a first valve controlling said inlet and hence the admission of material to said activator, a double acting ram operatively connected to said valve to control the same, a changeover valve whereby air under pressure may be selectively directed to a side of said ram thereby to effect opening and closing of said valve, means operative as a result of a build up in pressure during movement of the ram to open the first valve, to effect operation of said changeover valve with subsequent reversal of the ram and closure of said first valve, a second valve adapted normally to assume a closed position but on opening to allow air to be admitted to said activator thereby to blow material present therein through said discharge opening, pressure responsive means controlling said second valve, such means being operative to effect opening of said second valve as a result of a build up in pressure behind the ram at the conclusion of that operative stroke thereof which results in closure of said first valve and means responsive to a reduction in pressure in said activator following discharge of material therefrom to effect reversal of said changeover valve and consequent reversal of the ram thereby to effect reopening of said first valve and return of said second valve to its closed position.

References Cited in the file of this patent

UNITED STATES PATENTS

| | | |
|---|---|---|
| 1,935,843 | Goebels | Nov. 21, 1933 |
| 1,994,899 | Schaub | Mar. 19, 1935 |
| 2,027,697 | Nielsen | Jan. 14, 1936 |
| 2,032,367 | Kennedy | Mar. 3, 1936 |
| 2,221,741 | Vogel-Jorgensen | Nov. 12, 1940 |
| 2,380,651 | Jeffery | July 31, 1945 |
| 2,657,100 | Weller | Oct. 27, 1953 |
| 2,668,085 | Baresch | Feb. 2, 1954 |
| 2,678,240 | Snow | May 11, 1954 |